United States Patent [19]

Mehnert

[11] Patent Number: 4,873,518
[45] Date of Patent: Oct. 10, 1989

[54] PULSE WIDTH DISCRIMINATING CIRCUIT

[75] Inventor: Walter Mehnert, Ottobrunn, Fed. Rep. of Germany

[73] Assignee: MITEC Moderne Industrietechnik GmbH, Fed. Rep. of Germany

[21] Appl. No.: 890,042

[22] Filed: Jul. 25, 1986

[30] Foreign Application Priority Data

Jul. 26, 1985 [DE] Fed. Rep. of Germany ....... 3526839
Jul. 14, 1986 [DE] Fed. Rep. of Germany ....... 3623705

[51] Int. Cl.$^4$ .............................................. H04Q 9/00
[52] U.S. Cl. ........................ 340/825.070; 340/825.52; 340/825.63; 307/234
[58] Field of Search ...................... 340/825.07, 825.08, 340/825.52, 825.53, 825.62, 825.63, 825.65; 328/111, 112; 375/22; 370/9; 307/234; 329/106

[56] References Cited

U.S. PATENT DOCUMENTS

| | | | |
|---|---|---|---|
| 4,227,181 | 10/1980 | Brittain | 340/825.63 |
| 4,339,723 | 7/1982 | Yee | 328/112 |
| 4,486,752 | 12/1984 | Chihak | 340/825.63 |
| 4,558,316 | 12/1985 | Young | 340/825.63 |

Primary Examiner—Donald J. Yusko
Assistant Examiner—Edwin C. Holloway, III
Attorney, Agent, or Firm—Sughrue, Mion, Zinn, Macpeak & Seas

[57] ABSTRACT

A pulse width discriminating circuit is disclosed which makes possible the selection of pulses having a width less than and greater than predetermined limits. At least one type of pulses can be selected whereas all other pulses are rejected. However, several different types of pulses can also be discriminated in which case a specific indication signal indicating the type of pulses to which a received pulse belongs is generated. A received pulse is used for starting a timer means generating after a first predeterminable time a lower limit signal and after a second predeterminable time an upper limit signal if the received pulse is still present at these times. A latch flip-flop is set by the lower limit signal and is reset by the one of the two following signals which occurs first: either by the upper limit signal or by the delayed trailing edge of the received pulse. An AND-gate which generates the indication signal receives at its first input an output signal from the latch flip-flop if the latter is set, but is disabled to generate the indication signal as long as the undelayed received pulse is present at its second input.

7 Claims, 3 Drawing Sheets

PULSE WIDTH DISCRIMINATING CIRCUIT

FIELD OF THE INVENTION

The invention concerns pulse width discriminating circuits.

BACKGROUND OF THE INVENTION

Such circuits are for example used in the measuring and selecting units of measuring arrangements, the measuring and selecting units of which are connected by means of a cable one with the other and with a central unit from which they can be individually selected and activated and to which, at least in the activated state, they can deliver information data, such as for example measurement results.

Such measuring arrangements are for example described in the published German patent application Ser. No. 30 25 837. In order to select and to activate an individual measuring or selecting unit a respective address signal in the form of coded electrical pulses is emitted from the central unit on a respective core of the cable to all measuring and/or selecting units of the system. Each measuring and selecting unit of the system comprises an addressable circuit with an address memory which stores an address characterizing the respective measuring or selecting unit, and an address recognition circuit which compares the stored address with the addresses transmitted from the central unit. Only the address recognition circuit of the measuring or selecting unit the stored address of which is identical with the address transmitted from the central unit generates a control signal which is used for further purposes as, for example, for closing or opening a switch, for enabling or disabling gate circuits and so on.

In such known measuring arrangements it is further required to transmit to the measuring and selecting units at least one further kind of signal which processes a function different from the address signal but likewise has the form of electrical pulses. In the measuring arrangement described in the abovenamed published German patent application, the further kind of signals are setting pulses which must be fed to the address recognition circuits of the addressable circuit arrangements at least at the start of each interrogation cycle in order to set these address recognition circuits into a state of readiness, starting from which they are in a position of comparing addresses sent from the central unit with the individual address stored in their circuit arrangement and of generating a control signal on co-incidence. In the named German patent application a logic "1" is then entered into the first stage of a shift register with the aid of this control signal, which logic "1" is then in the further course shifted from stage to stage through the shift register. Instead thereof, however, an otherwise opened switch can be closed transiently or a normally closed switch can be opened briefly or any kind of similar function can be initiated by means of the control signal.

From the published German patent application Ser. No. 30 25 837, it is known to feed the address signal pulses and the setting signal pulses from the central unit to two separate inputs of the addressable circuit arrangements. This has the disadvantage that an individual signal transmission path, for example an individual cable core, must be provided for each further kind of signal which is to be fed to the addressable circuit arrangements in addition to the address signal.

In order to overcome the need of providing as many signal lines as different kinds of signals are to be transmitted from the central unit to the measuring and selecting units it is possible to transmit all the different kinds of signals on one and the same line or core of the cable and, at each measuring and selecting unit, to feed them to one and the same unit input.

For distinguishing the signal pulses of the different kinds from one another the pulses of each kind of signal have a specific length or width in time which is different from the widths of the signal pulses of all other kinds of signals. From the input of each measuring and/or selecting unit, to which all these different signal pulses having different widths are fed, they are forwarded to a pulse width discriminating circuit which has as many outputs as different kinds of signals are to be discriminated.

For each output of the pulse width discriminating circuit a specific lower and a specific upper limit are provided and the discriminating circuit generates upon receipt of a signal pulse an indication signal at a given output only if the width of the respective signal pulse is greater than the corresponding lower limit and less than the corresponding upper limit.

It is an objective of the invention to provide a pulse width discriminating circuit which is able to determine exactly whether the width of at least one kind of signal pulses is greater than the respective lower limit and less than the respective upper limit by using only a very small number of simple and reliable circuitry units the number of which is to be enhanced only slightly if for each of several different kinds of signal pulses a respective indication signal is to be generated at a respective output.

SUMMARY OF THE INVENTION

In practicing the invention a pulse width discriminating circuit comprises a time measuring means responsive to the received signal pulses and providing for each signal pulse a lower limit signal when the width of the signal pulse exceeds the respective lower limit and an upper limit signal when the width of said pulse exceeds the respective upper limit.

This time measuring means can be implemented by providing an oscillator generating output pulses having an exactly predeterminable pulse sequence frequency, a digital counter which, upon the occurrence of the leading edge of a signal pulse, starts counting the output pulses of the oscillator and stops said counting upon the occurrence of the trailing edge of the respective signal pulse, and a decoder gate arrangement for generating the respective lower and upper limit signals when the counted number of oscillator pulses exceeds respectively predetermined limit values.

According to a second embodiment, the time measuring means can comprise for each lower limit signal and for each upper limit signal to be generated a timer circuit consisting of a charging resistor to the first end of which a pulse corresponding to the respective signal pulse is applied, a charging capacitor, the first end of which is connected with the second end of said resistor and to the second end of which a predeterminable fixed voltage level is applied, and a SCHMITT trigger the input of which is connected with the second end of said resistor and the first end of said capacitor, wherein the values of said resistor and said capacitor are so selected that the resulting time constant is equal to the respective desired lower or upper limit.

In both cases a pulse width discriminating circuit according to the invention further comprises a delay member delaying each signal pulse by a predeterminable period of time, and at least one digital latch circuit which is set by the corresponding lower limit signal from the time measuring means and which is reset by the first occurring one of the following two signals: either by the corresponding upper limit signal from the time measuring means or by the trailing edge of the respective delayed signal pulse. Furthermore, for each digital latch circuit a logic AND gate is provided which has two inputs to the one of which the positive output signal of the set digital latch circuit is applied whereas the other input is disabled by the respective undelayed signal pulse, whereby the output of said logic AND gate provides the corresponding indication signal if said latch circuit is not reset by the corresponding upper limit signal before the occurrence of the trailing edge of the respective undelayed signal pulse, i.e., if the trailing edge of the respective signal pulse occurs after the lower limit signal and before the upper limit signal from the time measuring means.

If the signal pulses of two or more different kinds of signals are to be discriminated, two or more digital latch circuits and two or more AND gates are provided which are arranged and operate in the same manner as described above. Only the respective lower and upper limit signals from the time measuring means for the different digital latch circuits are generated at different instants so that each latch circuit and its associated AND gate generate an indication signal only when a signal pulse having the respective width is received.

It is therefore a feature of the invention to provide a simple, inexpensive and versatile width discriminating circuit.

BRIEF DESCRIPTION OF THE DRAWINGS

The above and other advantages will become apparent from the following detailed description which is made with reference to the accompanying drawings, in which.

DETAILED DESCRIPTION OF PREFERRED EMBODIMENTS

Figure 1:
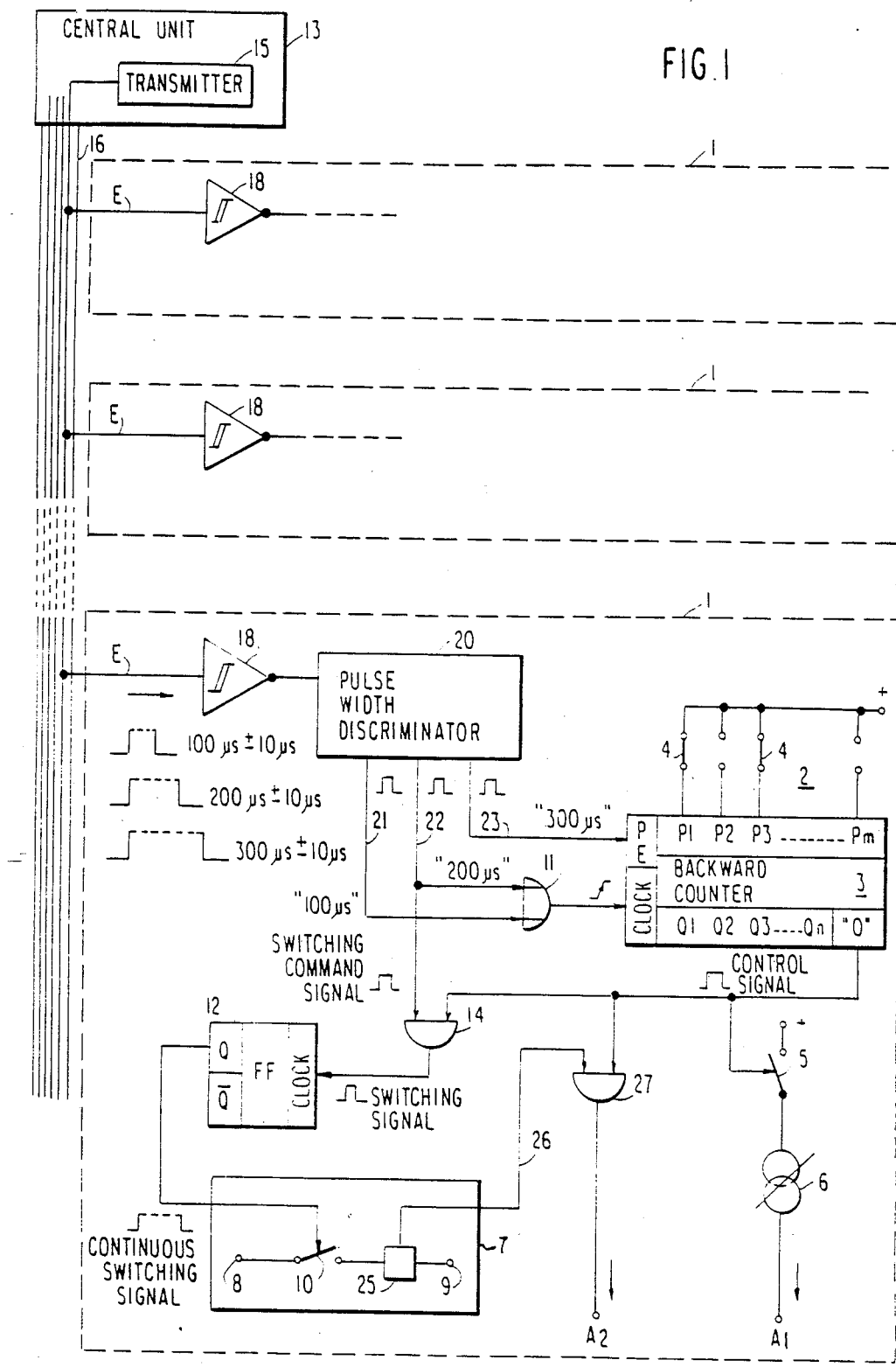
FIG. 1 shows in schematic form, an addressable circuit arrangement with a pulse discriminator which, according to the invention is constructed as pulse width discriminator and represented as simple block.

FIG. 1 shows a system comprising a plurality of identically constructed addressable circuit arrangements 1, only one of which is represented in detail. All the addressable circuit arrangements 1 are connected one with the other and with a central unit 13 by means of a cable 16. Among others the central unit 13 comprises a transmitter 15 which is adapted to transmit address and control signals in the form of coded electrical rectangular pulses on one of the cores of cable 16 to all addressable circuit arrangements 1.

Since it is required that each of the many circuit units 1 can be selected individually from the central unit and be set for a short time into an activated state, in which it generates a control signal initiating or enabling further functions, each addressable circuit arrangement 1 is associated with an individual address which is laid down in an address memory 2 belonging to the circuit arrangement 1.

Since the address, which is emitted in the form of coded electrical rectangular pulses from the central unit for the selection of a circuit arrangement, goes in common to a plurality of addressable circuit arrangements 1, each circuit arrangement 1 possesses an address recognition circuit 3, which in the present case is formed by a programmable reverse counter, the programming inputs $P_1, P_2, \ldots, P_m$ can be applied with the aid of wire bridges 4 to a positive voltage or be left free. The entirety of these wire bridges 4 and the programming inputs left free forms the address memory 2.

The numerical value, which is predetermined by the wiring of the programming inputs $P_1, \ldots, P_m$ is entered into the reverse counter 3 through a setting signal, which is fed to the PE input of the programmable reverse counter 3 and reduced by the reverse counter 3 by the numerical value "1" each time a counting pulse is fed to its pulse input T. When the count value in the programmable reverse counter 3 in this manner reaches the numerical value "0", a logic "1", which can find use as control signal, appears at the "0" output of the reverse counter 3, which until then was lying at logic "0".

This manner of the address storage and recognition has the consequence that the addresses can be emitted from the central unit in the form of a sequence of electrical rectangular pulses of uniform width, wherein the coding of a certain address is given by the number of the individual pulses contained in such a pulse sequence. In order thus for example to select the addressable circuit unit 1 with the address "5", the central unit must emit a pulse sequence with five individual pulses, for which then, if no further measures are taken, the addressable circuit arrangement 1 with the address "1" is selected first, then the circuit arrangement 1 with the address "2" and so forth in sequence.

The logic "1", which appears as control signal at the "0" output of the programmable reverse counter 3 of a selected circuit arrangement 1, serves for example to close a switch 5, whereby a measuring sensor 6, which in the example of embodiment shown in FIG. 1 is formed by a temperature-sensitive current source 6, is applied to a positive supply voltage. Hereby, the measuring sensor 6 delivers an impressed current which is dependent on the magnitude of its ambient temperature and is fed by way of the output $A_1$, which stands in connection with a core of the not illustrated cable, as measurement value to the central unit.

On the reception of the next address pulse coming from the central unit, the reverse counter 3 counts a programmable circuit arrangement 1, which has been selected and activated until then, to the count value "-1" and the control signal at its "0" output disappears so that the switch 5 is again opened and the measuring sensor 6 is no longer supplied with voltage. The activation of a certain programmable circuit arrangement 1 always lasts only until the next address signal is emitted from the central unit, which in the present case, in which this next address signal consists only of a single address pulse, is only a comparatively short space of time in an entire system pulsed through rapidly.

In many cases of application, however, a requirement now exists with the aid of a selected programmable circuit arrangement 1 to switch on any kind of unit 7, for example a lamp, a measuring sensor, an electrical motor or the like, not only for a short time, i.e. for the duration of the activated state of the circuit arrangement 1, but for a longer space of time and later also again to switch it off at an almost freely selectable instant. In the FIG. 1, the unit 7 is illustrated symbolically as rectangle, in which an on-off switch 10 is represented, which connects or separates two terminals 8 and 9.

This switch 10 shall according to what has been said above thus be caused to change its switching state only when its associated addressable circuit arrangement 1 is activated and a pulse-shaped switching command signal is fed to it from the central unit at the same time.

For this purpose, the switch 10 is driven from a switching signal storage circuit 12, which in the present case is formed by a flip-flop, the Q-output of which is connected with the control input of the switch 10. The pulse input of the flip-flop 12 receives a pulse-shaped switching signal from a switching command circuit 14, which in the present case is formed by an AND-gate, whenever a switching command signal is delivered from the central unit and the considered programmable circuit arrangement 1 is activated at the same time. In order to recognise the latter, the one input of the AND-gate 14 is connected with the "0" output of the reverse counter 3 so that a pulse appearing at its second input is passed on only when the control signal in the form of a logic "1" is present at the "0" output of the reverse counter 3.

If one assumes that the flip-flop forming the switching signal storage circuit 12 is initially disposed in the rest state, in which a logic "0" appears at its Q-output, whereby the switch 10 is opened, then this flip-flop 12 reacts to the rising edge of a switching signal pulse delivered by the switching command circuit 14 in the manner that a logic "1" appears at its Q-output which logic "1", closes the swith 10 and remains maintained as continuous switching signal until a further switching signal is fed to the pulse input of the flip-flop 12. If one assumes that the central unit constantly and sequentially selects the plurality of programmable circuit arrangements 1, then such a switching signal, through which the switch 10 is either closed or opened, can be generated once in each selection cycle. According to the number of programmable circuit arrangements 1 connected with the central unit, such a change in the switching state of the switch 10 is possible at spacings of a few milliseconds or hundredths or tenths of a second; apart from this limitation for the instants of switching-on and switching-off, the switch 10 can thus be opened or closed practically at any desired instants and remain opened or closed for spaces of time as long as desired.

From this description of the basic functions of the selectable circuit arrangement 1 within a system comprising a plurality of such circuit arrangements, it is evident that at least three different kinds of electrical rectangular pulses must be fed from the central unit to each of these circuit arrangements 1, namely address signal pulses or counting pulses for the programmable reverse counter 3, switching command signal pulses for the switching on or off of the unit 7 and setting signal pulses, which serve at the beginning of each selection cycle to write the address contained in the address memory 2 anew into the reverse counter forming the address recognition circuit 3. Should an addressable circuit arrangement 1 be associated with several units 7, which can be switched on or off one independently of the other, then it is required to provide several kinds of switching command signal pulses which are then at the suitable instants sent from the central unit to the respective addressable circuit arrangement 1.

According to the invention, all named pulse kinds concern electrical rectangular pulses which in the examples of embodiment reproduced in the figures differ one from the other only by their temporal length or width. It is here assumed that the address pulses emitted from the exchange each possess a width of 100 microseconds, which can fluctuate by at most ±10 microseconds, whilst the switching command signal pulses possess a temporal width of 200±10 microseconds and the setting pulses a temporal width of 300 ±10 microseconds.

All these different kinds of pulses are fed to the addressable circuit arrangements 1 each time over a common line by way of a common input E, behind which —as FIG. 1 shows —is connected initially a Schmitt trigger circuit 18 regenerating and inverting the pulse shape. It is presumed in this description that the rectangular pulses arriving at the input E are undisturbed by interference, i.e. in particular possess the correct temporal width required for their unambiguous identification and also the correct temporal spacings one from the other and that no interference pulses occur, which can be confused with the useful signal pulses or so chop these up into shorter pulses that the useful signal pulses are no longer recognisable as such. Allowed for here as only disturbance is that the temporal width of the pulses varies within the above stated fluctuation width of ±10 microseconds. Should these conditions not be fulfillable readily, then it is necessary to provide a digital filter which separates the useful signal pulses from the interference pulses and, if required, regenerates chopped-up useful signal pulses again to the full length. Such a filter is described by way of example in the German patent application Ser. No. P36 08 440.9.

The inverted output pulses of the Schmitt trigger circuit 18 are then fed to a pulse width discriminator 20 which possesses three output lines 21, 22 and 23. The pulse width discriminator delivers a pulse of suitable length on the output line 21 whenever it has at its pulse input received an address signal pulse, i.e. a pulse, the temporal width of which lies between a first lower limit of 90 microseconds and a first upper limit of 110 microseconds. The pulse width discriminator delivers a pulse of suitable length on the output line 22 whenever it has at its input received a switching command signal pulse, i.e. a pulse, the temporal width of which lies between a second lower limit of 190 microseconds and a second upper limit of 210 microseconds. The pulse width discriminator 20 delivers an output pulse of suitable length on the output line 23 whenever it has at its input received a setting signal pulse, i.e. a pulse with a temporal width between a third lower limit of 290 microseconds and a third upper limit of 310 microseconds.

As FIG. 1 shows, the output line 21 of the pulse width discriminator 20 is connected by way of an OR-gate 22 with the counting input T of the reverse counter 3 so that the output pulses of the pulse width discriminator 20, which appear on the output line 21, are fed as address or counting pulses to the reverse counter 3. The second input of the OR-gate 22 is connected with the output line 22 of the pulse width discriminator 20, which beyond that also drives the second input of the AND-gate 14. In this manner, the switching command signal pulses perform a double function. On the one hand, they serve as counting pulses for the reverse counter 3 and on the other hand as switching signal pulses for the triggering of the flip-flip 12 when a control signal is present at the "0" output of the reverse counter 3. This double function of the switching command signal pulses has the advantage that it is not necessary for the change of the switching state of flip-flop 12 of a certain addressable circuit arrangement 1 first to pulse down the concerned reverse counter to the count value "0" and then to generate an additional switching command signal pulse, which would lead to an appreciable multiplication of the pulses to be transmitted and thereby to an undesired prolongation of the scanning cycle times particularly when units 7 must be switched on or off very frequently in a larger system. Instead thereof, the reverse counter 3 concerned can rather be pulsed down to the count value "1" and then be caused to deliver a control signal through generation of a switching command signal pulse. Since the pulse input of the reverse counter 3 reacts to the rising edge of the pulses fed to it, the AND-gate 13 is opened at the right time in every case before the switching command signal pulse again disappears.

The OR-gate 22 can also be omitted so that the counting input T of the reverse counter 3 is driven only by the output pulses of the pulse width discriminator 20, which appear on the line 21, whilst only the pulses of the pulse width discriminator 20, which appear on the output line 22, get to the concerned input of the AND-gate 14.

On the application of the supply voltage at the start of operation as well as also after an interruption of operation, the flip-flops 12 of the different circuit arrangements 1 can assume any desired switching states, i.e. generate or not generate a continuous switching signal independently of the previously given commands. In order that the central unit can in such cases ascertain which units are switched on or off, each of the units 7 comprises a sensor 25, which interrogates the switching state of the switch 10, thus for example ascertains whether a current does or does not flow through the switch 10 or a line connected immediately in front or behind the switch 10. When the switch 10 is closed, then it can be provided that the sensor 25 delivers a signal, which corresponds to a logic "1" and is fed by way of the line 26 to the one input of an AND-gate 27, at the other input of which lies the control signal delivered by the "0" output of the reverse counter 3. The output signal of the AND-gate 27 is given by way of an output $A_2$ for example to a core of the cable which connects the circuit arrangements 1 with the central unit. In this case, all outputs $A_2$ can be connected with one and the same cable core, since the AND-gate 27 at the output $A_2$ generates a signal characterising the switching state of the switch 10 only when the concerned addressable circuit arrangement 1 has been selected and its address recognition circuit 3 generates the control signal. In this manner, the central unit can interrogate in sequence the switching states, in which the individual units 7 are disposed, and in a given case correct deviations from the commanded switching states.

In departure from the embodiment shown in FIG. 1, the unit 7 can for example also be formed by a self-maintaining relay, the switching contacts of which then correspond to the switch 10, whilst its self-maintaining equipment forms the switching signal storage circuit. In this case, the flip-flop 12 can then be omitted and the switching input of the relay can be driven by the output signal of the AND-gate 14 directly or by way of a driver.

Figure 2:
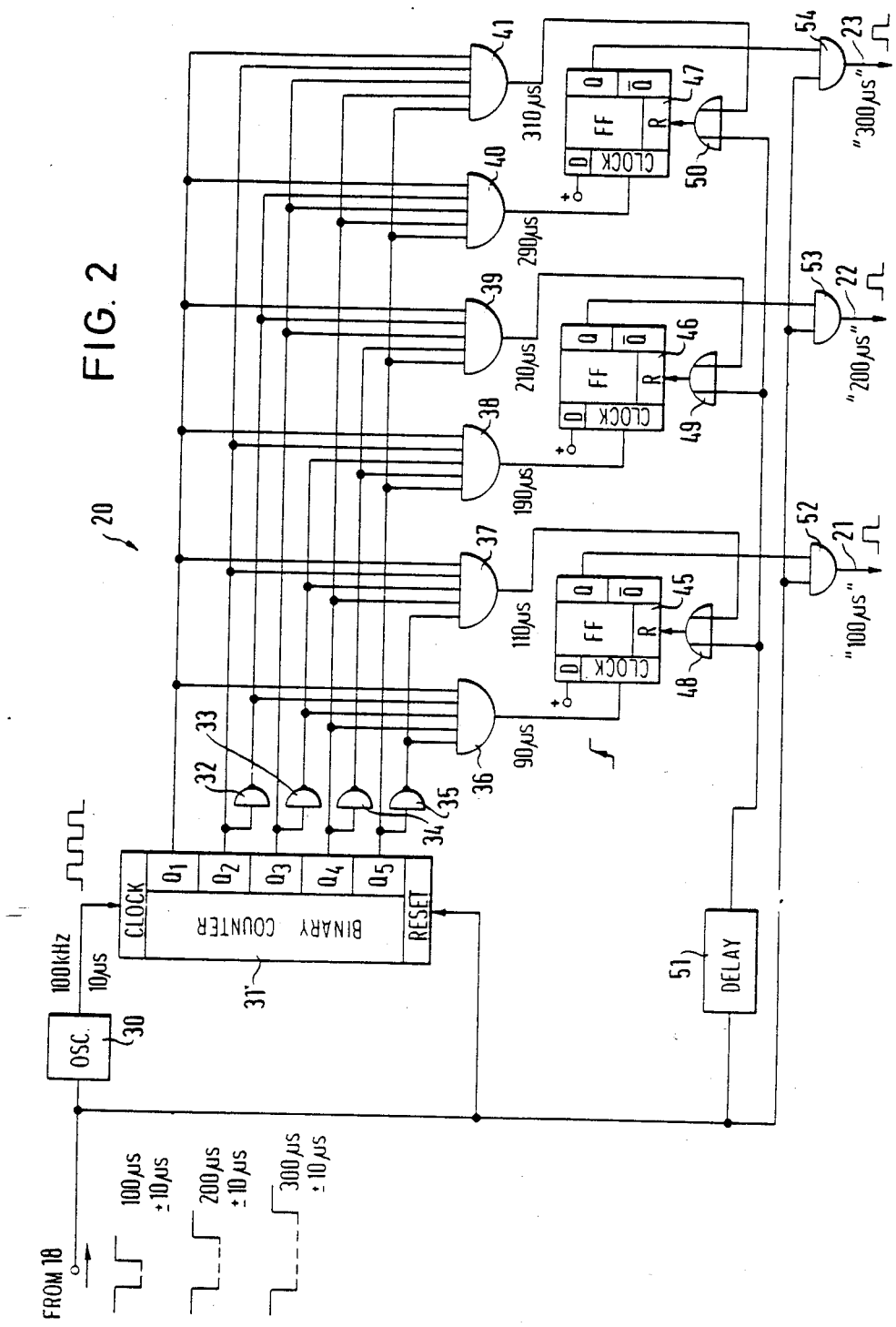
FIG. 2 represents a purely digitally operating embodiment of the pulse width discriminator of FIG. 1

In FIG. 2, a purely digital embodiment of the pulse width discriminator 20 of FIG. 1 is reproduced. The input pulses coming from the inverting Schmitt trigger circuit 18 are fed on the one hand to the initiating input, responding to logic "0", of an oscillator 30, which thereupon starts to oscillate for example at a frequency of 100 kilohertz. The output pulses of this oscillator get to the counting input of a binary counter 31, the reset input of which is likewise connected with the output of the inverting Schmitt trigger circuit 18 so that it is enabled on the appearance of an input pulse for the pulse width discriminator 20.

Connected behind the binary outputs $Q_1$ to $Q_5$ in the present case are four inverters 32 to 35 and six AND-gates 36 to 41, each of which comprises five inputs which are so connected with the binary outputs $Q_1$ to $Q_5$ or the inverters 32 to 35 inverting the signals of the binary outputs $Q_1$ to $Q_5$ that the AND-gate 36 interrogates the count value "9", the AND-gate 37 interrogates the count value "11", the AND-gate 38 interrogates the count value "19", the AND-gate 39 interrogates the count value "21", the AND-gate 40 interrogates the count value "29" and the AND-gate 41 interrogates the count value "31". Thus, a positive voltage pulse appears at the output of the AND-gates 36 to 41 whenever the binary counter 31 has counted for a space of time which has a length of 90 microseconds, 110 microseconds, 190 microseconds, 210 microseconds or 310 microseconds.

Furthermore, the pulse width discriminator 20 comprises three D-flip-flops 45, 46 and 47, wherein the clock input of the D-flip-flop 45 is connected limit signal from the output of the AND-gate 36, the clock input of the D-flip-flop 46 is connected to receive a second lower limit signal from the output of the AND-gate 38 and the clock input of the D-flip-flop 47 is connected to receive a third lower limit signal from the output of the AND-gate 40. The D-inputs of the flip-flops 45 to 47 are each applied to a positive voltage.

Each of the D-flip-flops 45 to 47 is associated with an OR-gate 48, 49 or 50, wherein the output of the OR-gate concerned each time drives the resetting input of the associated flip-flop. The one input of the OR-gate 48 is connected to receive a first upper limit signal from the output of the AND-gate 37, whilst the one input of the OR-gate 49 is connected to receive a second upper limit signal from the output of the AND-gate 39 and the one input of the OR-gate 50 is connected to receive a third upper limit signal from the output of the AND-gate 41. The respective second input of the OR-gates 48, 49 and 50 is connected with the output of a delay member 51, to the input of which are likewise fed the pulses delivered by the inverting Schmitt trigger circuit 18. Each of the Q-outputs of the D-flip-flops 45, 46 and 47 drives the one input of an associated AND-gate 52, 53 or 54, the respective second inputs of which directly receive the input pulses for the pulse width discriminator, which are delivered by the inverting Schmitt trigger circuit 18.

The output of the AND-gate 52 is connected with the line 21 also illustrated in FIG. 1, whilst the output of the AND-gate 53 supplies the line 22 and the output of the AND-gate 54 supplies the line 23 with signals.

When a negative input pulse appears at the input of the pulse width discriminator, then not only are the oscillator 33 enabled for oscillation and the binary counter 31 for counting-down of the oscillator pulses, but also the AND-gates 52, 53 and 54 are blocked at the same time. If 90 microseconds have elapsed after the appearance of the leading edge of the input pulse, then a logic "1" forming said first lower limit signal appears at the output of the AND-gate 36 and the then occurring rising edge sets the D-flip-flop 45 so that a logic "1" appears at its Q-output. As long as a negative input pulse is however present at the input of the pulse length discriminator 20, the AND-gate 52 remains blocked so that the logic "0" present on the line 21 does not change. If the input pulse lasts longer than 110 microseconds, then a logic "1" forming said first upper limit signal appears at this instant at the output of the AND-gate 37, which by way of the OR-gate 48 resets the D-flip-flop 45 so that the logic "0" now again appearing at the Q-output of this flip-flop continues to block the AND-gate 52 so that no change has occurred at its output, i.e. on the line 21.

The corresponding occurs after 190 microseconds and 210 microseconds at the outputs of the AND-gates 38 and 39, of the D-flip-flop 46, of the OR-gate 49 and of the AND-gate 53 or after 290 microseconds and 310 microseconds at the outputs of the AND-gates 40 and 41, of the D-flip-flop 47, of the OR-gate 50 and of the AND-gate 54.

If however an address pulse of a length of for example 105 microseconds is concerned in the case of the input pulse, then although the D-flip-flop 45 is set after 90 microseconds by the AND-gate 36, the gate 37 can however no longer generate a logic "1", since the oscillator 30 is stopped and the binary counter 31 is reset through the logic "1" appearing at the end of the pulse. Since a logic "1" is present at the Q-output of the set D-flip-flop 45 at this instant, a logic "1" is applied to both inputs of the AND-gate 52 and a first indication signal is provided by the output of the AND-gate 52 onto the line 21 until the delay member 51 has passed the logic "1", that has occurred at the end of the input pulse, onto its output and thereby reset the D-flip-flop 45 by way of the OR-gate 48. Then, the Q-output of this flip-flop again goes to logic "0" and the AND-gate 52 is again blocked.

By reason of the fact that the end of the input pulse has occurred within the time window having a first lower limit of 90 microseconds and a first upper limit of 110 microseconds, the AND-gate 52 has therefore given a first indication signal pulse onto the line 21, the temporal length of which is given by the delay time of the delay member 51. In corresponding manner, second and third indication signal pulses appear on the lines 22 or 23 when the end of the input pulse of the pulse width discriminator 20 falls into the time window having a second lower limit of 190 microseconds and a second upper limit of 210 microseconds or into the time window having a third lower limit of 290 microseconds and a third upper limit of 310 microseconds.

The example of embodiment of a pulse width discriminator illustrated in FIG. 3, in like manner as the example of embodiment of FIG. 2, comprises the three D-flip-flops 45, 46 and 47, the three OR-gates 48, 49 and 50, the three AND-gates 52, 53 and 54 and the delay member 51, which are connected one with the other and function in like manner as was described in connection with FIG. 2.

Figure 3:
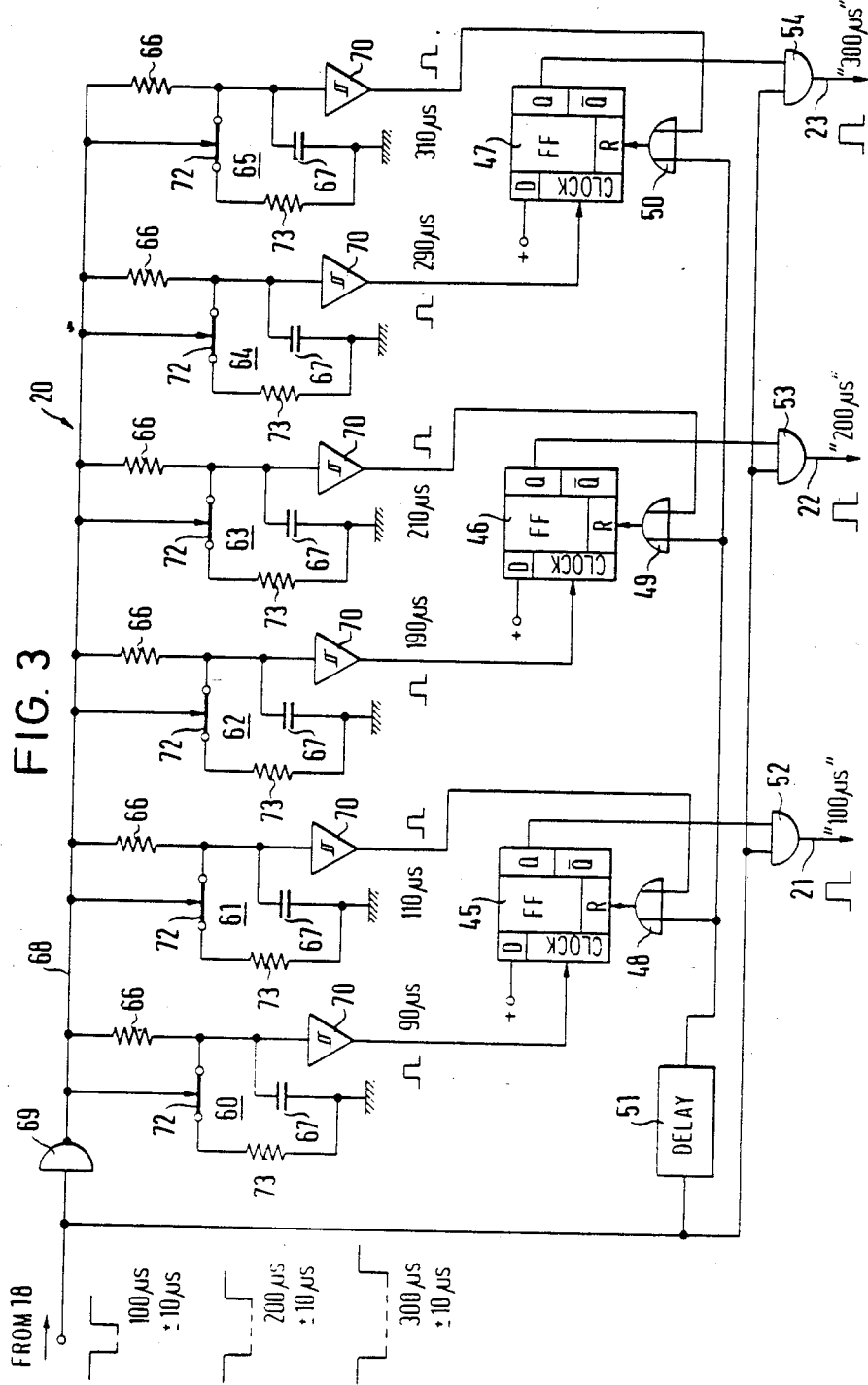
FIG. 3 shows an embodiment, built up with analog time members, of the pulse width discriminator of FIG. 1.

The most significant difference between both these examples of embodiment consists in that in the embodiment according to FIG. 3, the upper and lower limits are defined not in digital manner, but with the aid of analog circuits 60 to 65. Since all these analog circuits are built up in the same manner, their build-up and their function is described in the following only with reference to circuit 60.

Circuit 60 possesses an RC-member, which is formed by a charging resistor 66 and a charging capacitor 67, as time-determining member. Both these elements are connected each in series with the other and that terminal of the charging resistor 66, which forms one end of this series connection, is connected with a line 68, on which appear the input pulses, inverted by an inverter 69, of the pulse width discriminator 20. That terminal of the capacitor 67, which forms the other end of the RC-member 66 and 67, is applied to ground. Connected with the junction between the charging resistor 66 and the capacitor 67 is the input of a Schmitt trigger circuit 70, the output of which in the case of the analog switching circuits 60, 62 and 64 generate the lower limit signals driving the clock input of the associated D-flip-flop 45, 46 or 47 respectively and in the case of the analog circuit 61, 63 and 65 generates the upper limit signals driving the second input of the OR-gate 48, 49 and 50 and by way of its output the resetting input of the associated D-flip-flop.

Arranged in paralled with each capacitor 67 is a controllable switch 72 and a discharge resistor 73 lying in series with this switch. The control inputs of the switches 72 are connected directly with the line 68 and it is here assumed that the switches 72 are held closed by the logic "0" normally prevailing on the line 68 and opened by the logic "1" appearing on the line 68 on the occurrence of an input pulse for the pulse width discriminator 20.

The values of the charging resistors 66 and the capacitors 67 are so chosen that the Schmitt trigger circuits 70 of the different analog circuits respond 90 microseconds, 110 microseconds, 190 microseconds, 210 microseconds, 290 microseconds and 310 microseconds, respectively, after the occurrence of a positive voltage pulse on the line 68 when this pulse is present for sufficiently long.

When such a pulse appears, then initially all switches 72 are opened, the closing of which has taken care that the capacitors 67 have with certainty been discharged completely. The logic "1" prevailing on the line 68 then tries to charge the capacitors 67 by way of the charging resistor 66. After the above-named times predetermined by the corresponding time constants, the respective response threshold of the associated Schmitt trigger circuit 70 is exceeded so that its output supplies a positive output signal, with the aid of which then, in a manner corresponding to the example of embodiment described in FIG. 2, the flip-flops 45 to 47 are set or reset by the output signals of the AND-gates 36 to 41. When the input pulse disappears and a logic "0" thereby again appears on the line 68, the switches 72 are closed and the capacitors 67 are discharged by way of the resistors 73. The resistance value of the resistors 73 is chosen to be substantially smaller than the smallest resistance value of the resistors 66 so that all RC-members 66 and 67 are discharged substantially more rapidly than they are charged. This makes possible a secure time determination also when the input pulses of the pulse width discriminator follow one upon the other at short spacings.

I claim:

1. An addressable circuit arrangement, in particular for use in measuring and selecting units of a measuring arrangement, which measuring and selecting units are connected by means of a cable with each other and with a central unit comprising a transmitter from which signal pulses having different widths are transmitted to said measuring and selecting units, said addressable circuit arrangement comprising:

(a) an address memory for storing an address characterizing the addressable circuit arrangement, (b) an address recognition circuit for comparing the stored address with addresses transmitted from said central unit in the form of signal pulses having a first width in time, and which, on agreement of a received address with the stored address, delivers a control signal, and (c) a pulse width discriminating circuit for generating at least a first indication signal for each received signal pulse having a width greater than a first preselected lower limit and less than a first preselected upper limit, said pulse width discriminating circuit comprising:

(1) a time measuring means responsive to said signal pulses and providing for each signal pulse at least a first lower limit signal when the width of said signal pulse exceeds that first lower limit and a first upper limit signal when the width of said signal pulse exceeds said first upper limit.

(2) a delay member delaying each signal pulse by a preselected period of time, (3) at least a first digital latch circuit having a signal output and being set by said first lower limit signal from said time measuring means and being reset by the corresponding first upper limit signal from said time measuring means if said first upper limit signal occurs before the trailing edge of the respective delayed signal pulse, and being reset by the trailing edge of the respective delayed signal pulse if said trailing edge occurs before said upper limit signal, and (4) at least a first logic AND gate means having a first and a second input, said first input being connected to said signal output of said first digital latch circuit and said second input being supplied with a signal preventing said first logic AND gate means from generating an output signal as long as a signal pulse is present at the input of the pulse width discriminator, whereby the output of said first logic AND gate means provides said first indication signal if said latch circuit is not reset by said first upper limit signal before the occurrence of the trailing edge of said undelayed signal pulse.

2. A circuit arrangement according to claim 1,
wherein said time measuring means further provides for each signal pulse a second lower limit signal when the width of said signal pulse exceeds a second lower limit, and a second upper limit signal when the width of said signal pulse exceeds said second upper limit, and wherein a second digital latch circuit is provided which is set by said second lower limit signal from said time measuring means and which is reset either by the corresponding second upper limit signal from said time measuring means or by the trailing edge of the respective delayed signal pulse, and wherein a second logic AND gate means is provided having two inputs to the one of which the positive output signal of the set second digital latch circuit is applied whereas the other input is disabled by the respective undelayed signal pulse, whereby the output of said second logic AND gate means provides a second indication signal if said latch circuit is not reset by said second upper limit signal before the occurence of the trailing edge of said undelayed signal pulse.

3. A circuit arrangement according to claim 2,
wherein said time measuring means further provides for each signal pulse a third lower limit signal when the width of said signal pulse exceeds a third lower limit, and a third upper limit signal when the width of said signal pulse exceeds said third upper limit, and wherein a third digital latch circuit is provided which is set by said third lower limit signal from said time measuring means and which is reset either by the corresponding third upper limit signal from said time measuring means or by the trailing edge of the respective delayed signal pulse, and wherein a third logic AND gate means is provided having two inputs to the one of which the positive output signal of the set third digital latch circuit is applied whereas the other input is disabled by the respective undelayed signal pulse, whereby the output of said third logic AND gate means provides a third indication signal if said latch circuit is not reset by said third upper limit signal before the occurence of the trailing edge of said undelayed signal pulse.

4. A circuit arrangement according to any one of claims 1 to 3, wherein said time measuring means comprises
an oscillator generating output pulses having an exactly predeterminable pulse sequence frequency, a digital counter which, upon the occurrence of the leading edge of a signal pulse, starts counting the output pulses of said oscillator and stops said counting upon the occurrence of the trailing edge of the respective signal pulse, and a decoder gate arrangement for generating the respective lower and upper limit signals when the counted number of oscillator pulses exceeds respectively predetermined limit values.

5. A circuit arrangement according to claim 4, wherein said oscillator is started for each signal pulse upon the occurrence of the leading edge of said signal pulse and is stopped upon the occurrence of the trailing edge of said signal pulse.

6. A circuit arrangement according to any of claims 1 to 3, wherein said time measuring means comprises for each lower limit signal to be generated and for each upper limit signal to be generated a timer circuit consisting of
a charging resistor to the first end of which a pulse corresponding to the respective signal pulse is applied, a charging capacitor, the first end of which is connected with the second end of said resistor and to the second end of which a predeterminable fixed voltage level is applied, and a SCHMITT trigger the input of which is connected with the second end of said resistor and the first end of said capacitor, and wherein the values of said resistor and said capacitor are so selected that the resulting time constant is equal to the respective desired lower or upper limit.

7. A circuit arrangement according to claim 6, wherein each timer circuit further comprises
a controllable ON/OFF switch which is opened when a signal pulse is applied to the first end of said charging resistor, and is closed when the respective signal pulse has disappeared, and a second resistor the value of which is less than the value of said charging resistor, said second resistor being connected in series with said controllable ON/OFF switch and the series arrangement of said ON/OFF switch and said second resistor being connected in parallel with said charging capacitor, whereby said charging capacitor can be discharged very quickly after the disappearance of a signal pulse to be ready for the handling of the next subsequent signal pulse.

* * * * *